United States Patent [19]

Capdeville et al.

[11] Patent Number: 4,915,884
[45] Date of Patent: Apr. 10, 1990

[54] PROCESS FOR PRODUCTION OF GRANULAR MATERIAL FOR WATER TREATMENT

[75] Inventors: Bernard Capdeville, Toulouse; Yves Aurelle, Aucamville; Michel Roustan, Ramonville Saint Agne; Henri Roques, Portet sur Garonne, all of France

[73] Assignee: Institut National des Sciences Appliquees de Toulouse, Toulouse, France

[21] Appl. No.: 167,587

[22] Filed: Mar. 14, 1988

[30] Foreign Application Priority Data

Mar. 13, 1987 [FR] France ................ 87 03611

[51] Int. Cl.$^4$ ............................................. B29B 9/06
[52] U.S. Cl. ..................................... 264/15; 252/175; 264/49; 264/143
[58] Field of Search ............... 264/142, 143, 141, 15, 264/118, 49; 252/175

[56] References Cited

U.S. PATENT DOCUMENTS

| | | | |
|---|---|---|---|
| 2,862,243 | 12/1958 | Farr et al. | 264/142 X |
| 2,918,701 | 12/1959 | Hull et al. | 264/142 |
| 3,207,818 | 9/1965 | Marshall | 264/142 X |
| 3,436,449 | 4/1969 | Treu et al. | 264/142 |
| 4,385,016 | 5/1983 | Gwinn | 264/142 |
| 4,581,443 | 4/1986 | Garg | 264/142 X |
| 4,606,873 | 8/1986 | Biglione et al. | 264/142 X |

*Primary Examiner*—Jan H. Silbaugh
*Assistant Examiner*—Mary Lynn Fertig
*Attorney, Agent, or Firm*—Harold H. Dutton, Jr.

[57] ABSTRACT

A granular water treatment material and a process for the production thereof, the material being in the form of spherical granules, each having a thermoplastic polymeric matrix (1) and a more dense adjuvant in the form of micro-grains (3) dispersed in the matrix; each granule has on the surface a porosity in the form of micro-cavities (4) and cationic hydrophilic sites distributed on the surface; the process includes providing a mixture of an oxidizable thermoplastic resin and an adjuvant in powdered form, heating the mixture to make it plastic, extruding the plastic material to a diameter corresponding to the size of the granules to be obtained and cutting the extrusions to a length equal to this diameter, achieving a beading of the extruded pieces, oxidizing the surface of the spherical granules thus obtained, then ionically grafting a cationic polyelectrolyte to the surface of said granules.

20 Claims, 3 Drawing Sheets

PROCESS FOR PRODUCTION OF GRANULAR MATERIAL FOR WATER TREATMENT

This invention relates to a process for the production of a granular material for water treatment. The invention seeks to obtain a material specifically adapted to the particular method of water treatment for which the material is intended. In particular, the invention applies to the production of a granular material for biological water treatment (as by fixed microorganisms or a fixed biomass) or physicochemical treatment (filtration in a flow through bed). The invention also relates to a new granular material susceptible of being produced by the process.

By the term "water treatment" is understood both the treatment of waters in order to make them potable and the purification of waters or aqueous residual effluents.

BACKGROUND AND OBJECTS OF THE INVENTION

In a conventional manner, the treatments of water use natural granular materials such as sands or gravels, expensive or inexpensive clays, activated carbon, either reconstituted or not, and other mineral products. These materials are selected as a function of the treatment intended, in order to fix micro-organisms in the case of biological treatment, or to physically trap the materials in suspension in the case of filtration treatments. The interest in these materials is related to their availability and their low cost, but they are not well adapted to these treatments, and the processes for carrying out the treatments are rather deficient and poorly performing, especially for biological treatments with fixed biomasses.

French Pat. No. 83.07186 describes a composite material for biological treatment. This material is formed of thermoplastic matrices of an essentially cylindrical form, on the surface of which have been fixed adsorbent particles of activated carbon. This material has essentially the same properties for micro-organism fixation as the activated carbon, but differs by an improved mechanical strength. However, this material remains sensitive to the phenomena of attrition and is only adapted to a single type of biological treatment, treatment in a fixed bed, either immersed or by flowing therethrough. It should be noted that, by expansion of the synthetic matrix, it is possible to modulate the density of the material, however this expansion is very difficult in practice to control and the size of the particles is related to the degree of expansion and this is not adjustable independently of the density. Further, such a material lends itself poorly to cleaning operations in view of the elimination of the fixed biomass.

The present invention provides a new material for the treatment of water, having volume and surface properties which are improved with respect to existing materials.

One object of the invention is to provide a process for manufacturing such a granular material which permits adjusting the characteristics thereof as a function of the intended manner of use, in such a manner that the material may be optimized hydrodynamically and for material transfer.

In particular, the invention permits carrying out water treatments, either in a fixed bed, or in a turbulent bed or in a fluidized bed.

Another object of the invention is to improve the efficiency of the material with respect to known materials—the fixation efficiency of micro-organisms in the case of biological treatments, and efficiency of physicochemical retention in the case of filtrations.

Another object of the invention is to provide a material lending itself to easy and economical washings or cleanings.

A further object of the invention is to provide a material having improved mechanical properties with respect to the composite material of activated carbon described above, making the material in particular insensitive to the phenomena of attrition.

DESCRIPTION OF THE INVENTION

The process of the invention provides for the production of a granular water treatment material and permits obtaining spherical granules of a density (i.e. specific gravity) 'd' and a size or diameter 't', which are independently adjustable in the respective ranges $1 < d \leq 3$ and $0.5 \text{ mm} \leq t \leq 10 \text{ mm}$, in order to permit adapting the granules to the type of water treatment intended. To this end, the manufacturing process according to the invention comprises:

mixing an oxidizable thermoplastic-resin, of a specific gravity 'dr' less than 'd', with an adjuvant in the form of a powder of a granulometry less than about 200 microns and of a specific gravity 'da' such that $da > (1.7d - 0.7dr)$, the mixture being achieved in such a manner that the weight percentage 'pa' of the adjuvant in the mixture is such that:

$$pa = \frac{da(d - dr)}{d(da - dr)}$$

heating the mixture so as to make it plastic,
  extruding the plastic mixture through an extrusion plate in such a manner as to produce plastic rods of a diameter slightly greater than 't',
  cutting the rods immediately at the outlet of the extrusion plate into pieces in order to obtain plastic pieces of a length essentially equal to their diameter,
  causing a soaking of said plastic pieces in such a manner as to bring about, by the effect of cooling and shrinking, a beading of the pieces conferring upon them a spherical granular form,
  carrying out an oxidation of the spherical granules, such as to create hydrophilic sites on the surface thereof, in order to give to the granules a wettability preferential to water with respect to air.

By "adjuvant" is understood both a powder of a single component as well as a mixture of powders, the density considered 'da' of the adjuvant being, in this latter case, the average density of the mixture.

The oxidizable thermoplastic resin may be selected in a known manner from among the following families: polyolefin resins, polystyrene resins, polysulfone resins, polyvinylic resins and polyamide resins, the particular resin used being a polymer or a copolymer of these families having freely oxidizable double bonds.

The process of the invention yields a continuous matrix in which are dispersed in a homogeneous manner the grains of the adjuvants, such that each granule has a good mechanical resistance or strength related to the nature of the base resin used.

The process of the invention permits an independent adjustment of the two parameters of volume (specific gravity, size of the granules) conditioning the hydrodynamics and material transfer in the processes of water treatment. In the case of biological treatments with fixed micro-organisms, the size of the granules will be chosen in such a manner that the biological film which forms around each granule remains of a thickness which is slight with respect to the size of the granule, such that the resulting specific gravity of the bioparticle is stable (graining of the film affecting only very slightly the specific gravity of the particle). Thus, sudden changes of the specific gravity prejudicial to the hydrodynamics of the reactor are suppressed as well as risks of entraining highly charged particles (as with a very voluminous coating). The specific gravity of the material is selected in such a manner as to optimize the operation of the process phase selected: energy necessary in the washing phase is minimized in the case of fixed bed processes, energy of fluidization or of placing in suspension is minimized in the case of fluidized or turbulent bed processes.

Preferably, the adjuvant is chosen to have a narrow spectrum of granulometry, comprising between 10 and 100 microns, and of a specific gravity 'da' such that $2.2d - 1.2dr \leq da \leq 50d - 49dr$. This choice seems to optimize generally the qualities of the resistance or strength of the granules, while permitting the adjustment of the specific gravity indicated above independently of the size of the granules. By "narrow spectrum granulometry" is understood a granulometry for which the size of the largest grains or the smallest grains do not differ by more than 100% from the size of the average grains.

Further, the spherical form of the granules to which the process leads minimizes the interactions between particles, avoids the effects of interparticulate flocculation and permits maintaining a very favorable homogeneous bed with a good material transfer (absence of preferential passage).

Moreover, the surface properties related to the wettability of the material assure a good interaction between the material and the water to be treated and avoid, in the case of triphasic reactors (solid bed of granules, aqueous phase liquid to be treated and gaseous phase: air, fermentation gas, nitrogen . . . ) a gas/solid interaction, thus suppressing the phenomena of flotation of the granules and the risks of flocculation between particles (by trapping of gas bubbles).

The oxidation of the granules may be carried out by any known process and in particular by placing the granules in contact with, for example, a sulfochromic mixture (sulfuric acid, potassium bichromate and water) or with fuming sulfuric acid. Clearly, other processes such as ozonization may also be used.

Preferably, the oxidation of the granules is carried out to a degree of oxidation corresponding to a hydrophilic state characterized by an angle of contact of the material vis-a-vis water in the presence of air of less than about 40°. The granules thus obtained assure an excellent interaction with the water to be treated and, the case being, lend themselves perfectly to the execution of a final complementary treatment such as described hereafter, which then improves this interaction.

According to a preferred embodiment, the process is completed by a final treatment of the spherical granules which comprises grafting by way of ions, a cationic polyelectrolyte to the surface of the granules. This final treatment may particularly be carried out by placing the granules in contact with an aqueous solution containing a polyelectrolyte of the following group: polyethyleneimine hydrochloride, polyvinyl-ammonium hydrochloride, aluminum polychloride. This placing in contact may be assured by any process, especially by immersion in a column through which circulates the aqueous solution.

This final treatment presents the advantage of neutralizing the negative hydrophilic sites due to the oxidation and creating, at each of such sites, numerous cationic hydrophilic sites, very favorable to the fixation of micro-organisms which generally are negatively charged, and to the adsorption (by chemisorption) of materials in colloidal suspension which also present negatively charged surfaces, which represents an essential advantage in filtration. Further, this final treatment accentuates the hydrophilic nature of the material (each anionic site being replaced by several cationic sites) and the advantages indicated above relative to the interactions of the solid/liquid/gas phases are reinforced.

The first embodiment for obtaining these superficial microporosities comprises selecting an adjuvant which is a water soluble mineral salt (calcium chloride, iron sulfate, sodium bicarbonate, etc.), in order to create these microporosities by subsequent solubilization of the grains of this salt situated on the surface of the granule upon subsequent contact of the granule with an aqueous phase. This placing in contact may be assured, either by a soaking step carried out in a cold aqueous bath, or through a special immersion operation in water before the oxidation phase. The dissolution of the adjuvant grains situated on the surface of the granules causes the appearance of a multitude of micro-cavities, notably augmenting the kinetics of biological treatments.

Another embodiment comprises selecting an adjuvant which comprises a water insoluble product susceptible of being chemically attacked, and thereafter subjecting the granules to a superficial chemical treatment, capable of attacking the adjuvant in order to create a micro-porosity on the surface.

In this latter case, one may advantageously choose as the adjuvant calcium carbonate or a silicate, and subject the granules to an acid attack which dissolves the grains of these salts on the surface, causing the appearance as before of a multitude of micro-cavities.

The invention also relates to the granular material produced, having the physico-chemical characteristics of the material obtained by the process previously defined. This material itself is characterized in that it is presented in the form of spherical granules of a specific density 'd' and a size 't', such that $1 < d \leq 3$ and $0.5 \text{ mm} \leq t \leq 10 \text{ mm}$, and further in that:

each spherical granule comprises a thermoplastic polymeric matrix and a more dense adjuvant in the form of micrograins dispersed in that matrix, each granule has on its surface a porosity in the form of micro-cavities, each of a dimension corresponding to that of at least one micrograin of adjuvant, and each granule having cationic hydrophilic sites distributed on the surface and in the micro-cavities.

It should be noted that, contrary to the composite material of French Pat. No. 83.07186 which is very sensitive to attrition which has a tendency to cause a disappearance of the activated carbon on the surface, each granule of material according to the invention has a continuous, superficially pitted skin, but without fragile particles projecting out, which considerably limits the effect of the phenomena of attrition on the granules.

The granular material according to the invention may be used for achieving biological treatments or physico-chemical treatments of water.

In the case of a biological treatment to be carried out in a fluidized bed, the specific gravity 'd' and the size 't' of the granules will be respectively adjusted in the following ranges, which are more specifically adapted to this manner of treatment:

$$1.05 \leq d \leq 1.2 \text{ and } 1.5 \text{ mm} \leq t \leq 3 \text{ mm}.$$

In the case of a biological treatment operating by placing the granules in suspension in an aqueous phase (turbulent bed), the specific gravity 'd' and the size 't' will be respectively adjusted to be in the following ranges:

$$1.01 \leq d \leq 1.05 \text{ and } 1.5 \text{ mm} \leq t \leq 3 \text{ mm}.$$

In the case of a biological treatment to be carried out in a fixed, immersed bed, the specific gravity 'd' and the size 't' will respectively be adjusted such that:

$$d \geq 1.1 \text{ and } t \geq 3 \text{ mm}.$$

In the case of filtration of water in a fixed flow through bed, the specific gravity 'd' and the size 't' will respectively be adjusted such that:

$$d \geq 1.1 \text{ and } 0.5 \text{ mm} \leq t \leq 3 \text{ mm}.$$

DESCRIPTION OF THE DRAWINGS

The invention is illustrated hereafter by examples of manufacture and operating examples, the use of the material having been made in a known device such as shown in FIG. 5 of the drawings. In these drawings.

DESCRIPTION OF THE PREFERRED EMBODIMENTS

1. Example Of Manufacture

The granular material to be produced in the present example is intended for biological treatments in a fluidized bed of used, residual city waters.

In this application, the size 't' of each granule of material, which is selected so as to minimize in this application the energy of fluidization and to always maintain a very thin, biological film around these granules, is 2.7 mm. The specific gravity 'd' which contributes to conditioning the hydrodynamic conditions of fluidization, has been chosen to be d=1.19.

To obtain a granular material adapted to such a biological treatment in a fluidized bed, one mixes a powder of thermoplastic resin comprising a high density polyethylene, with an adjuvant comprising calcium carbonate (insoluble in water) in the form of a powder. The resin powder has a granulometry on the order of several hundreds of microns and a specific gravity of 0.96, while the adjuvant has an average granulometry equal to 30 microns, the spectrum of the granulometry of the adjuvant being between 10 and 50 microns. The specific gravity 'da' of the adjuvant is 2.71.

This adjuvant has been chosen for the fact that its specific gravity 'da' is much greater than that of the resin, satisfying the relation:

$$2.2d - 1.2dr \leq da \leq 50d - 49dr,$$

such that in the example: $1.46 \leq da \leq 12.46$.

This relationship optimizes the weight percentage 'pa' of the adjuvant to be inserted in the resin which is calculated by the relationship:

$$pa = \frac{da(d - dr)}{d(da - dr)}$$

while attributing to this percentage a value such that, at the time, the resin is present in a sufficient quantity to constitute a continuous matrix and the adjuvant is in a sufficient quantity to create a sufficient microporous surface as indicated below.

The weight percentage of the adjuvant calculated by the formula given above is in the example equal to pa=30%.

After homogeneously mixing the two powders in this weight proportion (30% adjuvant, 70% resin), the mixture is introduced into the hopper of an extruder and is caused to circulate by means of an endless screw in the heating chamber which heats the mixture to a temperature of 200° C. This extruder, of a conventional type, is provided at its outlet with an extrusion plate having cylindrical extrusion holes of a diameter of 2.8 mm.

After the heating chamber, upstream of the extrusion plate, the resin is in the form of a plastic paste entraining the micrograins of the adjuvant. At the outlet of the extrusion plate, this paste forms cylindrical plastic strands or rods which are cut to lengths of 2.8 mm.

The plastic pieces thus obtained fall into a bath of cold water which provokes, by the effect of cooling and shrinking, a beading conferring upon the granules a spherical form of an average diameter equal to 2.7 mm. The measured density of these granules is 1.19.

Figure 1:
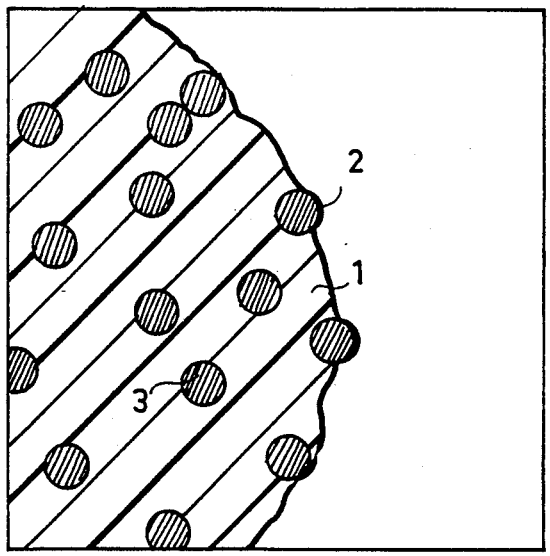
FIGS. 1, 2, 3 and 4 illustrate, on a greatly enlarged scale, a granule of the material in issue in the different steps of the process of manufacture.

FIG. 1 illustrates, in a partial view on a greatly enlarged scale, a granule, with its plastic matrix 1 and its adjuvant micrograins distributed both on the surface 2 and in the interior of the matrix 3.

The spherical granules thus obtained are immersed in an aqueous acid bath, containing 30% by weight of hydrochloric acid. The granules are left for half a day in this bath, then are washed with water.

Figure 2:
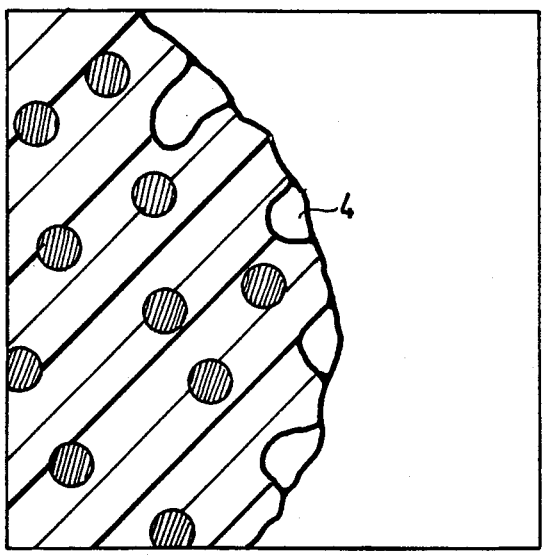

The granules thus obtained, observed under a microscope, have the appearance shown in FIG. 2: the micrograins of the surface 2 have been dissolved by a transformation into calcium bicarbonate and then dissolved in the water. They have left in their place micro-cavities such as shown schematically at 4. The internal micrograins 3 have remained intact.

The following step of the process comprises oxidizing the granules by means of a sulfochromic mixture comprising sulfuric acid (93% by weight), potassium bichromate (1% by weight) and water. The granules are left in the bath for about three hours, then are washed in an aqueous solution.

Figure 3:
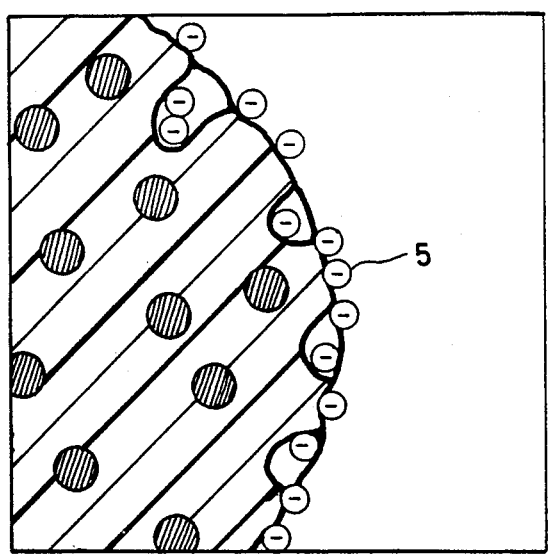

FIG. 3 illustrates the structure of the granules obtained which comprise anionic hydrophilic sites such as 5, distributed on the surface of the granule and in the microcavities. The presence of these sites is verified by the character of the compound being preferentially wetted by water with respect to air. The measured angle of contact was, in this case, near 0° (total spreading of the water droplet).

The final step of the process comprises grafting onto the anionic sites created in the preceding step a mineral polyelectrolyte comprising an aluminum polychloride (polyelectrolyte "WAC" produced by "Atochem").

The aluminum polychloride is presented in the form of a solution comprising 1,200 g of polyelectrolyte per liter. This solution is brought, by dilution in deionized water, to a concentration of 1 g per liter. The granules are immersed in this latter solution for three hours. After leaving the bath, an aqueous washing is carried out.

Figure 4:
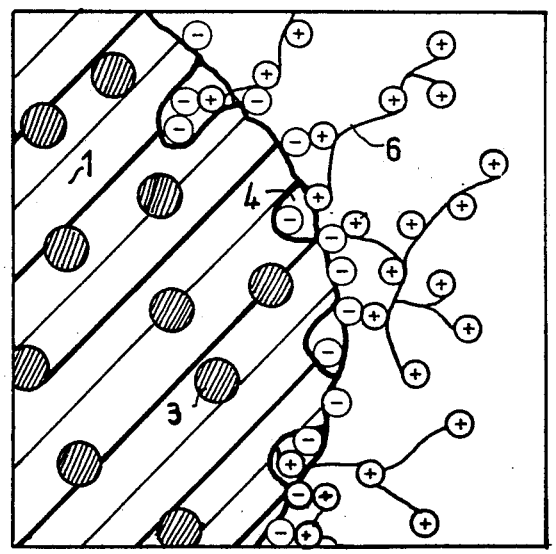

There is shown in FIG. 4 a granule after this polyelectrolyte treatment. Each anionic site has fixed by chemisorption a chain of polyelectrolyte, such that the granules thus treated have a great number of cationic hydrophilic sites distributed on their surface.

These cationic sites may be verified by coloring the granules by means of an anionic colorant of the phenol red type: this verifies a uniform red coloration around the grain, showing the ionic fixation of the colorant on the cationic sites of the material.

2. Use of the Material

Figure 5:
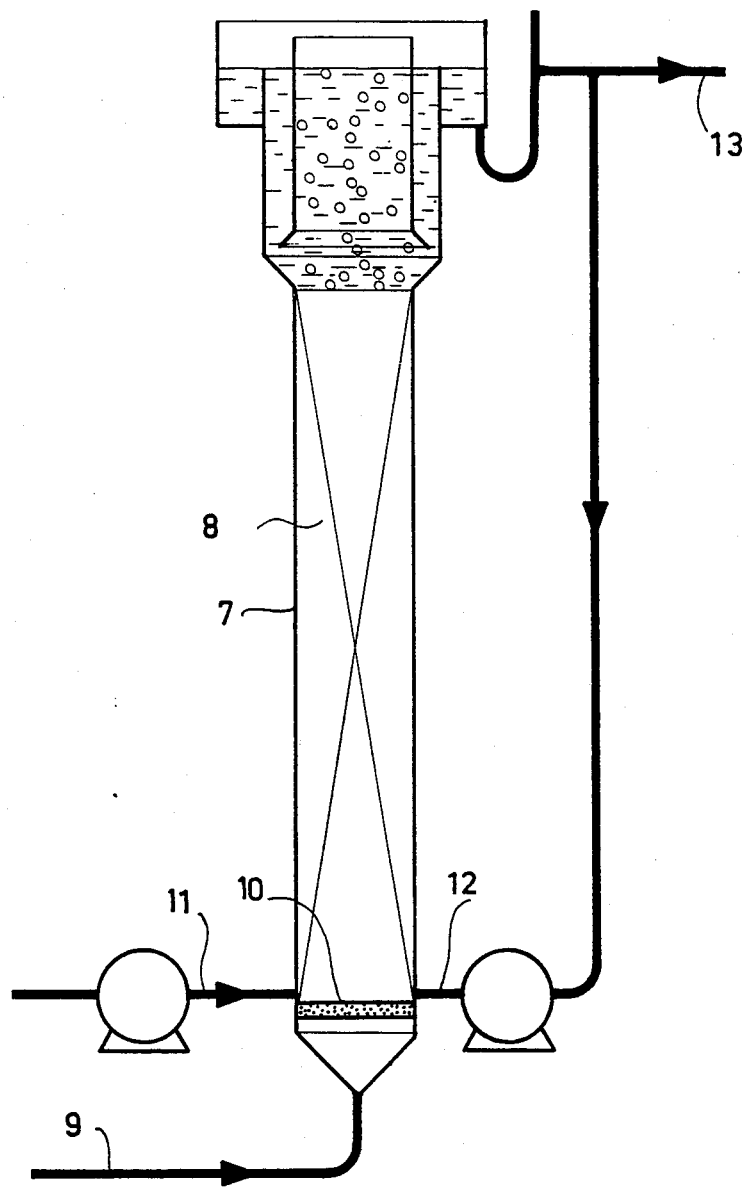
FIG. 5 is a schematic cross-section of a triphasic reactor of a fluidized bed having been used for production of the material.

The granules thus made are arranged in a bioreactor 7 such as shown schematically in FIG. 5, being present in the form of a vertical column containing an expansible bed 8. At its base, the reactor is fed with air by a conduit 9, across a fluidization distributor 10.

The city water to be treated is introduced by a conduit 11 above the distributor and a recirculation of the treated water is assured in a conventional manner by a conduit 12 in order to obtain an expansion of the bed to appropriate levels. The treated water is recovered by overflow through conduit 13.

It has been verified through long periods of operation that no entrainment of the granular material has been produced, the bubbles of air leaving at the top of the column being free of all granules. The upper solid/liquid interface is perfectly clean and well defined.

At the inlet, the residual waters introduced by the conduit 11 have the following characteristics:

T.O.D. (total oxygen demand): 420 mg $O_2$ per liter
T.O.C (total organic carbon): 150 mg per liter.

The time of passage of the water is 35 minutes and the speed of the air is 12 meters per hour. The liquid flow is at a rate of 10 liters per hour. These parameters correspond to an organic charge applied per cubic meter of reactor and per day of:

T.O.D.: 12.6 kg/m$^3$/day
T.O.C.: 4.7 kg/m$^3$/day

After the period of time indicated, the analysis of the treated waters provided the following data:

T.O.D.: 25 mg $O_2$/l
T.O.C.: 9 mg/l which correspond to the organic loads eliminated per cubic meter of the reactor and per day of:

T.O.D.: 11.8 kg/m$^3$/day
T.O.C.: 4.4 kg/m$^3$/day

The average yield of purification as to T.O.D as well as T.O.C. is 94%, which is remarkable.

The production of sludge obtained from these tests (recovered in a secondary decanter) is 0.48 kg of total dry material (T.D.M.) per kilogram of T.O.D. eliminated, or 1.2 kilogram of T.D.M. per kilogram of T.O.C. eliminated.

These excellent performances are due to the excellent hydrodynamic conditions, engendered by the material which assures a remarkable transfer of oxygen, due to a good stability of the fluidized bed and to a very favorable fixation of the micro-organisms on the granules by the thin film (without modification of the hydrodynamic conditions of fluidization over time).

In a similar installation are carried out comparative tests of oxygen transfer between several conventional materials: sand (granulometry of 0.3 mm), garnet (granulometry 0.380 mm), pumice stone (granulometry 0.3 mm) and the material in accordance with the invention which is described above (2.7 mm). The fluidization is carried out in each case in such a manner as to bring about a total expansion of the bed on the order of 2.5 times the initial height of the materials. The granulometries of the conventional materials have been selected in such a manner as to obtain a fluidization under good conditions with comparable energy consumption.

The parameter compared after these tests is the relationship of the oxygen transfer coefficient of the filled column, to the oxygen transfer coefficient of the unfilled column. The value of these coefficients characterize the influence of the material on the oxygen transfer. The results obtained are as follows:

sand: 0.47
garnet: 0.46
pumice stone: 0.42
granular material of the invention: 1.

As a result, in the case of the invention, the material does not modify the behavior of the gas/liquid dispersion while in the conventional materials, the bubbles coalesce between themselves and lower by more than half the quantities of oxygen transferred. Further, with the conventional materials, it has been verified that the displacement phenomena of the solid/liquid interfaces in the presence of air bubbles, creates a hydrodynamic instability.

Thus, the granular material according to the invention permits a very efficient fixation of the micro-organisms, in the form of a very dense thin film of active micro-organisms, without significant modification of the hydrodynamics over time.

While this invention has been described as having certain preferred features and embodiments, it will be apparent that it is capable of still further modification and variation without departing from the spirit of the invention, and this application is intended to cover any and all variations, modifications and adaptations as fall within the spirit of the invention and the scope of the appended claims.

We claim:

1. A process for the production of a granular water treatment material, permitting obtaining granules of a specific gravity 'd' and a size 't' adjustable independently within the respective ranges $1 < d \leq 3$ and $0.5 \text{ mm} \leq t \leq 10$ mm, in order to permit adapting said granules to the type of treatment for which said material is intended, said process comprising forming a mixture of an oxidizable thermoplastic resin, of a specific gravity 'dr' less than 'd', with an adjuvant in the form of a powder with a granulometry less than about 200 microns and a specific gravity 'da' such that $da > 1.7d - 0.7dr$, said mixture having a weight percentage of adjuvant 'pa' such that $$pa = \frac{da(d-dr)}{d(da-dr)}$$

heating said mixture to a plastic state, extruding said plastic mixture through an extrusion plate in such a manner as to produce cylindrical plastic strands of a diameter slightly greater than 't', immediately cutting said plastic strands at the outlet of said extrusion plate so as to obtain plastic pieces of a length essentially equal to their diameter, soaking said plastic pieces in such a manner as to cause by the effects of cooling and shrinking a beading of said pieces thereby forming spherical granules, subjecting said spherical granules to an oxidation so as to create hydrophilic sites on the surface thereof for imparting to said granules a wettability preferential to water with respect to air.

2. A process as in claim 1 and including subjecting said spherical granules to a final treatment comprising ionically grafting a cationic polyelectrolyte to the surface of said granules.

3. A process as in claim 2 and wherein said final treatment comprises placing said granules in contact with an aqueous solution containing a polyelectrolyte selected from the group consisting of: polyethylene-imine hydrochloride, polyvinyl-ammonium hydrochloride and aluminum polychloride.

4. A process as in claim 1 and wherein said oxidizable thermoplastic resin is selected from the group consisting of polyolefin resins, polystyrene resins, polysulfone resins, polyvinylic resins and polyamide resins, said resin being a polymer or a copolymer thereof having freely oxidizable double bonds.

5. A process as in claim 1 and wherein said adjuvant comprises a water soluble mineral salt, and creating a superficial micro-porosity on said granules by dissolving said grains of said salt on the surface thereof by contacting said granules with an aqueous phase.

6. A process as in claim 1 and wherein said adjuvant comprises a water insoluble material susceptible of chemical attack, and subjecting said granules to a superficial chemical treatment so as to attack said adjuvant for creating a microporosity on the surface of said granules.

7. A process as in claim 6, and wherein said adjuvant comprises calcium carbonate or a silicate, and contacting said granules with an acid.

8. A process as in claim 5 and including carrying out said oxidation of said granules so as to establish a degree of oxidation corresponding to a hydrophilic state characterized by an angle of contact of said material vis-a-vis water in the presence of air of less than 40°.

9. A process as in claim 8 an including carrying out said oxidation by contacting said granules with a sulfochromic mixture or a fuming sulfuric acid mixture.

10. A process as in claim 1 and wherein said adjuvant has a narrow spectrum granulometry between 10 and 100 microns and a specific gravity 'da' such that $2.2d - 1.2dr \leq da \leq 50d - 49dr$.

11. A process as in claim 1 for producing a granular material for biological or physico-chemical treatment of water and wherein said adjuvant comprises a water soluble salt, placing said granules in contact with an aqueous phase for creating a superficial microporous surface thereon, thereafter carrying out said oxidation step and subjecting said spherical granules to a final treatment comprising ionically grafting a cationic polyelectrolyte to the surface of said granules.

12. A process as in claim 1 for producing a granular material for biological or physico-chemical treatment of water and wherein said adjuvant comprises a water insoluble material susceptible of chemical attack, subjecting said granules to a chemical treatment for creating a superficial microporous surface thereon, thereafter carrying out said oxidation step and subjecting said spherical granules to a final treatment comprising ionically grafting a cationic polyelectrolyte to the surface of said granules.

13. A process as in claim 11 for producing a granular material for biological treatment by placing said granules in a fluidized bed, said process including adjusting the specific gravity 'd' and the size 't' of said granules respectively within the ranges $1.05 \leq d \leq 1.2$ and $1.5 \text{ mm} \leq t \leq 3 \text{ mm}$.

14. A process as in claim 12 for producing a granular material for biological treatment by placing said granules in a fluidized bed, said process including adjusting the specific gravity 'd' and the size 't' of said granules respectively within the ranges $1.05 \leq d \leq 1.2$ and $1.5 \text{ mm} \leq t \leq 3 \text{ mm}$.

15. A process as in claim 11 for producing a granular material for biological treatment by placing said granules in suspension in an aqueous phase, said process including adjusting the specific gravity 'd' and the size 't' of said granules respectively within the ranges $1.01 \leq d \leq 1.05$ and $1.5 \text{ mm} \leq t \leq 3 \text{ mm}$.

16. A process as in claim 12 for producing a granular material for biological treatment by placing said granules in suspension in an aqueous phase, said process including adjusting the specific gravity 'd' and the size 't' of said granules respectively within the ranges $1.01 \leq d \leq 1.05$ and $1.5 \text{ mm} \leq t \leq 3 \text{ mm}$.

17. A process as in claim 11 for producing a granular material for biological treatment by placing said granules in a fixed immersed bed, said process including adjusting the specific gravity 'd' and the size 't' of said granules respectively within the ranges $d > 1.1$ and $t \geq 3 \text{ mm}$.

18. A process as in claim 12 for producing a granular material for biological treatment by placing said granules in a fixed immersed bed, said process including adjusting the specific gravity 'd' and the size 't' of said granules respectively within the ranges $d > 1.1$ and $t \geq 3 \text{ mm}$.

19. A process as in claim 11 for producing a granular material for water filtration in a fixed flow through bed, said process including adjusting the specific gravity 'd' and the size 't' of said granules respectively within the ranges $d \geq 1.1$ and $0.5 \text{ mm} \leq t \leq 3 \text{ mm}$.

20. A process as in claim 12 for producing a granular material for water filtration in a fixed flow through bed, said process including adjusting the specific gravity 'd' and the size 't' of said granules respectively within the ranges $d \geq 1.1$ and $0.5 \text{ mm} \leq t \leq 3 \text{ mm}$.

* * * * *